United States Patent
Akarapu et al.

(10) Patent No.: US 11,345,059 B2
(45) Date of Patent: May 31, 2022

(54) METHODS OF LASER MACHINING WET CELLULAR CERAMIC EXTRUDATE FOR HONEYCOMB BODY MANUFACTURE

(71) Applicant: Corning Incorporated, Corning, NY (US)

(72) Inventors: Ravindra Kumar Akarapu, Horseheads, NY (US); Priyank Paras Jain, Horseheads, NY (US); Christopher John Malarkey, Corning, NY (US); Barada Kanta Nayak, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 432 days.

(21) Appl. No.: 16/308,222

(22) PCT Filed: Jun. 7, 2017

(86) PCT No.: PCT/US2017/036318
§ 371 (c)(1),
(2) Date: Dec. 7, 2018

(87) PCT Pub. No.: WO2017/214251
PCT Pub. Date: Dec. 14, 2017

(65) Prior Publication Data
US 2019/0255735 A1    Aug. 22, 2019

Related U.S. Application Data

(60) Provisional application No. 62/347,291, filed on Jun. 8, 2016.

(51) Int. Cl.
*B28B 11/16*    (2006.01)
*B01D 53/94*    (2006.01)
(Continued)

(52) U.S. Cl.
CPC .......... *B28B 11/16* (2013.01); *B01D 46/0001* (2013.01); *B01D 46/2418* (2013.01);
(Continued)

(58) Field of Classification Search
CPC ..... B29C 48/0022; B29C 48/11; B28B 11/16; B28B 11/243; B28B 2003/203; B01D 46/0001; B01D 53/94
See application file for complete search history.

(56) References Cited

U.S. PATENT DOCUMENTS 3,899,326 A * 8/1975 Frost ............... B22F 3/1115
264/639
5,465,780 A    11/1995 Muntner et al.
(Continued)

FOREIGN PATENT DOCUMENTS

CN    100333888 C    8/2007
CN    101903306 A    12/2010
(Continued)

OTHER PUBLICATIONS

Ramrattan; "The Effects of the Processing Parameters on the Laser Machining of a Green China Ceramic"; Iowa State University, Digital Repository; Retrospective Theses and Dissertations; pp. 9169; (1989) 146 Pages.
(Continued)

*Primary Examiner* — Atul P. Khare
(74) *Attorney, Agent, or Firm* — Joseph M. Homa

(57) ABSTRACT

A method of manufacturing a honeycomb body, comprising extruding honeycomb extrudate (200) in an axial direction (A), the honeycomb extrudate (200) having an outer periphery (206); and laser machining in situ the honeycomb extrudate (200) to form a laser cut in the honeycomb extrudate. A system for in situ cutting a wet green ceramic extrudate, comprising a laser (500, 732, 826) configured to
(Continued)

irradiate laser energy to an outer periphery of a wet green ceramic article, the laser energy adapted to cut through at least a portion of the outer periphery (206).

15 Claims, 6 Drawing Sheets

(51) Int. Cl.
  *B01D 46/00*   (2022.01)
  *B01D 46/24*   (2006.01)
  *B28B 3/20*   (2006.01)
  *F01N 3/28*   (2006.01)
  *B28B 11/12*   (2006.01)
  *B29C 48/00*   (2019.01)
  *B29C 48/11*   (2019.01)
  *B28B 11/24*   (2006.01)

(52) U.S. Cl.
  CPC ............ *B01D 53/94* (2013.01); *B28B 3/20* (2013.01); *B28B 11/12* (2013.01); *B28B 11/243* (2013.01); *B29C 48/0022* (2019.02); *B29C 48/11* (2019.02); *F01N 3/2828* (2013.01); *B01D 2255/9155* (2013.01); *B01D 2279/30* (2013.01); *B28B 2003/203* (2013.01)

(56) References Cited

U.S. PATENT DOCUMENTS

| | | | | |
|---|---|---|---|---|
| 5,670,104 A * | 9/1997 | Miura | ............... | B26F 3/004 264/145 |
| 5,698,121 A * | 12/1997 | Kosaka | ............... | B23K 26/0884 219/121.67 |
| 6,520,061 B2 * | 2/2003 | Fukuta | ............... | B23D 57/0007 125/16.02 |
| 6,531,678 B2 | 3/2003 | Yamamoto | | |
| 6,663,378 B2 | 12/2003 | Grover et al. | | |
| 6,710,290 B2 | 3/2004 | Yamamoto | | |
| 6,711,979 B1 * | 3/2004 | Miyakawa | ............... | B28B 11/14 83/785 |
| 6,994,816 B2 * | 2/2006 | Ishii | ............... | B26D 1/46 264/150 |
| 8,265,373 B2 * | 9/2012 | Urabe | ............... | G01N 21/952 382/141 |
| 8,407,915 B2 | 4/2013 | George et al. | | |
| 8,609,032 B2 | 12/2013 | Boger et al. | | |
| 8,641,942 B2 * | 2/2014 | Breuer | ............... | G01B 11/2518 264/40.1 |
| 8,871,132 B2 | 10/2014 | Abels et al. | | |
| 9,085,089 B2 | 7/2015 | Noni et al. | | |
| 9,238,308 B2 * | 1/2016 | Toba | ............... | B26D 7/086 |
| 9,278,485 B2 * | 3/2016 | Gale | ............... | B23K 26/38 |
| 9,810,847 B1 * | 11/2017 | Carberry | ............... | G02B 6/3861 |
| 9,950,392 B2 * | 4/2018 | Tiwari | ............... | B23K 26/382 |
| 10,946,551 B2 * | 3/2021 | Citriniti | ............... | B28B 11/14 |
| 2004/0164464 A1 | 8/2004 | Lubberts et al. | | |
| 2004/0195719 A1 | 10/2004 | Ishii et al. | | |
| 2010/0300053 A1 | 12/2010 | Alary | | |
| 2013/0056134 A1 * | 3/2013 | Masuda | ............... | B28B 11/12 156/89.22 |
| 2013/0134141 A1 * | 5/2013 | Santner | ............... | B23P 25/006 219/121.72 |
| 2014/0103016 A1 * | 4/2014 | Ward | ............... | B23K 37/047 219/121.39 |
| 2015/0108680 A1 | 4/2015 | Beecher et al. | | |
| 2015/0239140 A1 * | 8/2015 | Majestic | ............... | B26D 7/086 264/433 |
| 2015/0355416 A1 * | 12/2015 | Liu | ............... | G02B 6/2552 65/378 |
| 2016/0136760 A1 * | 5/2016 | Tiwari | ............... | B23K 26/382 264/400 |

FOREIGN PATENT DOCUMENTS

| | | | |
|---|---|---|---|
| CN | 103282327 A | | 9/2013 |
| CN | 105479010 A | * | 4/2016 |
| EP | 2565002 A1 | | 3/2013 |
| JP | 2001-096524 A | | 4/2001 |
| JP | 2002-178323 A | | 6/2002 |
| JP | 2004153141 A | | 5/2004 |
| JP | 2005317876 A | | 11/2005 |
| JP | 2006035303 A | | 2/2006 |
| JP | 05442974 B2 | | 3/2014 |
| WO | 2008053956 A1 | | 5/2008 |
| WO | 2013/031018 A1 | | 3/2013 |
| WO | 2014062214 A1 | | 4/2014 |
| WO | 2016/085781 A1 | | 6/2016 |

OTHER PUBLICATIONS

International Search Report and Written Opinion of the Interational Searching Authority; PCT/US2017/036318; dated Sep. 28, 2017; 12 Pages; European Patent Office.
Coherent Inc; "Applications" 2019) 2 Pages; https://www.coherent.com/Applications/index.cfm?fuseaction=forms.AppLevel2&AppLevel2ID=43.
Apps Lab Test Laser Cutting Green (Unfired) Ceramic; CMS Laser; 1 Page; Date Unknown; https://www.youtube.com/watch?v=qDTKM-hY77E.
Chinese Patent Application No. 201780047110.5; English Translation of the Office Action dated Feb. 25, 2020; China Patent Office; 12 Pgs.
Japanese Patent Application No. 2018-564392, Office Action dated Nov. 2, 2020, 6 pages (3 pages of English Translation and 3 pages of Original Document); Japanese Patent Office.

* cited by examiner

METHODS OF LASER MACHINING WET CELLULAR CERAMIC EXTRUDATE FOR HONEYCOMB BODY MANUFACTURE

CROSS-REFERENCE TO RELATED APPLICATIONS

This application is a National Stage application under 35 U.S.C. § 371 of International Application No. PCT/US2017/036318, filed on Jun. 7, 2017, which claims the benefit of priority of U.S. Provisional Application No. 62/347,291 filed Jun. 8, 2016, the content of which are incorporated herein by reference in their entireties.

BACKGROUND

Field

Exemplary embodiments of the present disclosure relate to methods of manufacturing honeycomb bodies and, more particularly, to laser machining wet cellular ceramic extrudate for porous ceramic honeycomb body manufacturing.

Discussion of the Background

After-treatment of exhaust gas from internal combustion engines may use catalysts supported on high-surface area substrates and, in the case of diesel engines and some gasoline direct injection engines, a catalyzed filter for the removal of carbon soot particles. Filters and catalyst supports in these applications may be refractory, thermal shock resistant, stable under a range of $pO_2$ conditions, non-reactive with the catalyst system, and offer low resistance to exhaust gas flow. Porous ceramic flow-through honeycomb substrates and wall-flow honeycomb filters may be used in these applications.

The manufacture of ceramic honeycomb structures may be accomplished by the process of plasticizing ceramic powder batch mixtures, extruding the mixtures through honeycomb extrusion dies to form honeycomb extrudate, and cutting, drying, and firing the extrudate to produce ceramic honeycombs of high strength and thermal durability. The ceramic honeycombs thus produced are widely used as ceramic catalyst supports in motor vehicle exhaust systems, and as catalyst supports and wall-flow particulate filters for the removal of soot and other particulates from diesel engine exhausts.

Among the commercially successful processes for ceramic honeycomb manufacture are those that utilize large co-rotating twin screw extruders for the mixing and extruding of ceramic honeycomb extrudate. Ram extrusion, pressing, casting, spraying and 3-dimensional printing are other processes for ceramic honeycomb manufacture.

Wet honeycomb extrudate is relatively quite soft and subject to damage in the course of further handling, particularly until it has been dried. Handling can cause shape distortion in wet honeycomb shapes comprising thin web and skin structures, or where especially large and heavy extrudate sections need to be handled. Further, extrudate sections of large diameter or frontal area transverse to the axis of extrusion can suffer from distortion and collapse of the honeycomb channel structure as that structure must bear the weight and withstand the lateral weight shifts of the upper structure in the course of transport and handling.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide a method of manufacturing a channel body.

Exemplary embodiments of the present disclosure also provide a method of manufacturing a honeycomb body.

Exemplary embodiments of the present disclosure also provide a system for in situ cutting a wet green ceramic extrudate.

Additional features of the disclosure will be set forth in the description which follows, and in part will be apparent from the description, or may be learned by practice of the disclosure.

An exemplary embodiment discloses a method of manufacturing a channel body, comprising extruding a channel extrudate, the channel extrudate comprising an outer periphery and at least one channel, wherein the channel extrudate comprises at least one of a ceramic powder, ceramic precursor, and ceramic composition; and laser machining in situ the channel extrudate as it is extruded to form a laser cut in the channel extrudate. The laser machining comprises exposing the channel extrudate to laser energy to ablate at least a portion of the outer periphery.

Another exemplary embodiment discloses a method of manufacturing a honeycomb body, comprising laser cutting at least a portion of a green extrudate as the extrudate moves in an extrudate travel direction, wherein the green extrudate is comprised of at least one of a ceramic powder, ceramic precursor, and ceramic composition.

Another exemplary embodiment discloses a system for in situ cutting a wet green ceramic extrudate, comprising a laser source configured to irradiate laser energy to an outer periphery of a wet green ceramic extrudate, the laser energy adapted to laser cut at least a portion of an outer periphery of the wet green ceramic extrudate. The wet green ceramic extrudate comprises at least one channel and the outer periphery, and the laser cut pierces the outer periphery to form an opening through the outer periphery exposing the at least one channel to ambient atmosphere through the opening.

It is to be understood that both the foregoing general description and the following detailed description are exemplary and explanatory and are intended to provide further explanation of the disclosure.

BRIEF DESCRIPTION OF THE FIGURES

The accompanying drawings, which are included to provide a further understanding of the disclosure and are incorporated in and constitute a part of this specification, illustrate exemplary embodiments of the disclosure, and together with the description serve to explain the principles of the disclosure.

DETAILED DESCRIPTION

It will be understood that for the purposes of this disclosure, "at least one of X, Y, and Z" can be construed as X only, Y only, Z only, or any combination of two or more items X, Y, and Z (e.g., XYZ, XYY, YZ, ZZ).

As used herein, "extrudate" refers to plasticized batch extruded through a die to form axially extending intersecting walls with channels there between. In this sense, plasticized batch refers to ceramic powder batch mixtures, ceramic precursor batches, or ceramic batch compositions that may comprise inorganic oxides or oxide precursors that when reacted form a ceramic, as well as ceramics that remain unreacted or react to form another ceramic in whole or in part. The channels can have cross sections of uniform or varying hydraulic diameter of various shapes, such as rectangular (square), hexagonal, trapezoidal, other polygonal, circular, elliptical, other curved shapes, and the like, and combinations thereof. Extrusion can be by a continuous process such as a screw extruder, a twin-screw extruder, and the like, or by a discontinuous process such as a ram extruder and the like. In an extruder, an extrusion die can be coupled with respect to a discharge port of an extruder barrel, such as at an end of the barrel. The extrusion die can be preceded by other structure, such as a generally open cavity, screen/homogenizer, or the like to facilitate the formation of a steady plug-type flow front before the batch reaches the extrusion die.

The extrudate generally has a co-extruded, integrally formed, outer peripheral surface (skin) that extends in the axial direction. The extrudate outer periphery can have various cross sectional shapes such as circular, elliptical, polygonal, etc., and combinations thereof, either symmetrical or asymmetrical. The plasticized batch can comprise inorganic powders, inorganic binders, organic binders, pore formers, solvents, non-solvents and the like. After the plasticized batch is extruded through the die to form the extrudate, it can be cut, dried, and fired to form a porous ceramic honeycomb body or porous ceramic honeycomb body segment.

The porous ceramic honeycomb body may be made of aluminum titanate based materials, such as aluminum titanate solid solution (pseudobrookite), silicon carbide, cordierite, feldspar, mullite, spinel, alumina, rutile, corundum, or similar oxides, or other oxide or non-oxide ceramics, including metals, intermetallics, glasses, mullite, alumina ($Al_2O_3$), zircon, alkali and alkaline-earth alumino-silicates, spinels, perovskites, zirconia, ceria, yttria, lanthanum oxide, silicon oxide ($SiO_2$), silicon nitride ($Si_3N_4$), silicon aluminum oxynitride (SiAlON), silicon carbide (SiC), zeolites, and combinations thereof. Application of the porous ceramic honeycomb bodies may include, for example, honeycomb integrated and non-integrated diesel and gasoline catalyst supports, substrates, and particulate filters.

Figure 1:
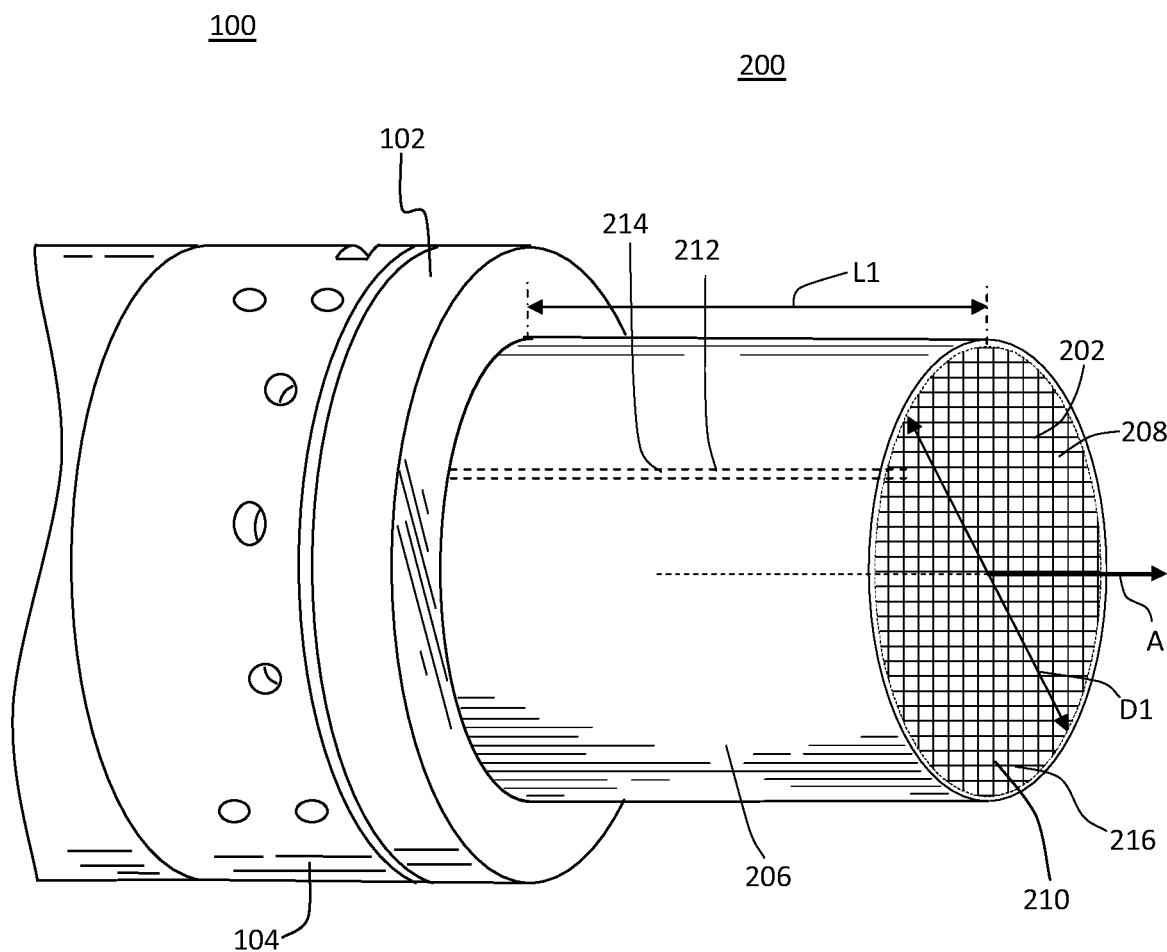
FIG. 1 is a schematic illustration of an extruder front end and a honeycomb extrudate.

FIG. 1 is a schematic illustration of an extruder and a channel extrudate. The extruder can include a front end 102 where the batch exits the extruder 100 as the channel extrudate 200. An extruder cartridge 104 can include extrusion hardware including an extrusion die and skin forming mask. The channel extrudate 200 can comprise at least one channel and an outer peripheral surface. At least one of the at least one channel comprises a wall formed by an inner surface of the outer periphery. The channel extrudate 200 can comprise a honeycomb structure. In the honeycomb structure, the at least one channel comprising a wall formed by an inner surface of the outer periphery is referred to as a partial cell channel. The channel extrudate 200 has a length L1 and includes a first end face 202 and an outer peripheral surface 206 extending from the extruder front end 102 to the first end face 202. A plurality of intersecting walls 208 can form mutually adjoining channels 210 that extend in the extrusion direction indicated by axial direction "A" and form a honeycomb matrix. Intersecting walls 212 forming a channel 214 extending in the extrusion direction are shown for illustration. A maximum cross sectional dimension perpendicular to the axial direction is indicated by "D1". For example, when the channel extrudate 200 is a cylinder shape, the maximum dimension "D1" may be a diameter of an end face 202. For example, when the channel extrudate 200 cross section perpendicular to the axial direction is a rectangular shape, the maximum dimension "D1" may be a diagonal of an end face.

While extrusion is illustrated as horizontal in FIG. 1, this disclosure is not so limited and extrusion can be horizontal, vertical, at some incline thereto, and at combinations thereof.

Cell density of the channel extrudate 200 comprising the honeycomb structure (honeycomb extrudate) can be between about 100 and 1500 cells per square inch (cpsi) (between about 15.5 and 232.5 cells per square cm). Typical cell wall thicknesses can range from about 0.025 mm to about 1.5 mm (about 1 to 60 mil). For example, honeycomb extrudate 200 geometries may be 400 cpsi with a wall thickness of about 8 mil (400/8) or with a wall thickness of about 6 mil (400/6). Other geometries include, for example, 100/17, 200/12, 200/19, 270/19, 600/4, 400/4, 600/3, 750/2, and 900/2. As used herein, honeycomb extrudate 200 is intended to include a generally honeycomb structure but is not strictly limited to a square structure. For example, hexagonal, octagonal, triangular, rectangular or any other suitable cell shape such as previously mentioned may be used. Also, while the cross section of the honeycomb extrudate 200 is illustrated as circular, it is not so limited, for example, the cross section can be elliptical, square, rectangular, or other desired shape, and a combination thereof.

Upon exiting the extruder 100 in direction of arrow "A" (axial direction), the plasticized batch stiffens into a wet extrudate 200 comprising a network of axially extending intersecting walls 208 (webs) that form axially extending channels 210 and an axially extending outer peripheral surface 206. The webs 208 and channels 210 comprise the matrix 216. Disposed at the outer periphery of the matrix 216 is the outer peripheral surface 206. The outer peripheral surface 206 may be referred to herein interchangeably as a co-extruded skin 206, an integrally formed co-extruded skin 206, or skin 206. While described as comprising a plurality of channels, the wet extrudate may also be one channel in some exemplary embodiments, such as a pipe, wherein the channel makes up the hollow interior of the pipe.

For ease of description, the exemplary embodiments refer to wet green honeycomb bodies and wet extrudate, but the disclosure is not so limited, and also includes wet greenware, for example, wet green trough filters and radial flow filters. That is, wet greenware refers to greenware prior to drying as used herein.

The batch material upon exiting the extruder front end 102 can be a wet green channel extrudate 200 that can be cut to length L2 forming a second end face 218 (See FIG. 2) to form a wet green channel body 220. That is, the wet green channel body 220 can be cut from the wet green channel extrudate 200. The outer peripheral surface 206 of the wet green channel body 220 can extend axially from the first end face 202 to the second end face 218. The wet green channel extrudate 200 can be supported on a support such as an air bearing, tray, or conveyor that moves in the extrudate travel direction. The wet green channel body 220 can be transported to a dryer on a support such as an air bearing or a tray suitable for supporting a length of extrudate 200 such as a body 220 for transport to a dryer. Tray features may include an axial length and a transverse cross-section revealing a concave portion defining a support surface, that surface being configured to support the body 220. The longitudinal axis of the tray and the section of extrudate forming channel body 220 may be parallel to the direction of extrusion and to the orientation of honeycomb channels 210 in that section of extrudate.

Examples of trays to support honeycomb extrudate are provided in U.S. Pat. No. 8,407,915, issued Apr. 2, 2013, and U.S. Pat. No. 9,085,089, issued Jul. 21, 2015, both of which are hereby incorporated by reference in their entireties as if fully set forth herein.

The channel extrudate 200 can have a bow when it exits the extrusion die of the extruder front end 102. Examples of extrudate bow corrector devices for correcting bow in a stream of extruded material are provided in U.S. Pat. No. 6,663,378, issued Dec. 16, 2003, U.S. patent application having Ser. No. 10/370,840 and Publication No. 2004/0164464, published Aug. 26, 2004, and U.S. patent application having Ser. No. 14/061,129 and Publication No. 2015/0108680, filed on Oct. 23, 2013, all of which are hereby incorporated by reference in their entireties as if fully set forth herein.

Figure 2:
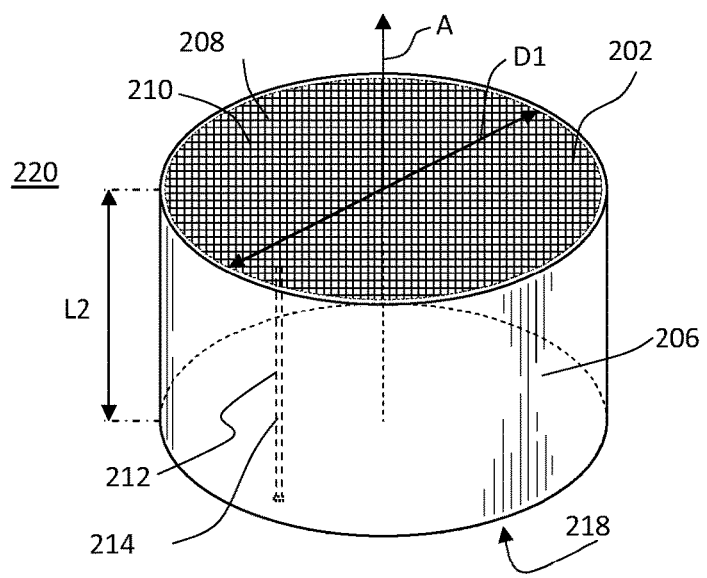
FIG. 2 illustrates a schematic honeycomb body according to exemplary embodiments of the disclosure.

FIG. 2 illustrates a schematic channel body 220 according to exemplary embodiments of the disclosure. The channel body 220 can be severed from the extrudate 200. Severing can be done by wire cutting, saw cutting, such as a band saw or reciprocating saw, laser cutting, etc. The channel body 220 can have a honeycomb structure, a length L2, volume V2, and include the first end face 202, the second end face 218 and an outer peripheral surface 206 extending from the first end face 202 to the second end face 218. The plurality of intersecting walls 208 that form mutually adjoining channels 210 extending in the axial direction "A" between opposing end faces 202, 218, according to exemplary embodiments of the disclosure, form the honeycomb matrix 216. Intersecting walls 212 forming a channel 214 extending between the end faces 202, 218 are shown for illustration. The axial direction is indicated by arrow "A" and a maximum cross sectional dimension perpendicular to the axial direction is indicated by "D1". The top face 202 refers to the first end face 202 and the bottom face 218 refers to the second end face 218 of the channel body 220 (honeycomb body) positioned in FIG. 2, otherwise the end faces are not limited by the orientation of the honeycomb body 220. The top face 202 may be an inlet face and the bottom face 218 may be an outlet face of the honeycomb body 220. The outer peripheral surface 206 of the honeycomb body 220 extends axially from the first end face 202 to the second end face 218. While described as comprising a plurality of channels, the channel body 220 may also be one channel in some exemplary embodiments, such as a pipe, wherein the channel makes up the hollow interior of the pipe. As used herein, the channel body 220 can be a log that can undergo further processing prior to firing or the channel body 220 can be a piece of final size substantially ready for firing.

For ease of description, the exemplary embodiments refer to channel body and honeycomb body, but the disclosure is not so limited, for example, trough filters and radial flow filters are also included in this disclosure.

Figures 3A, 3B:
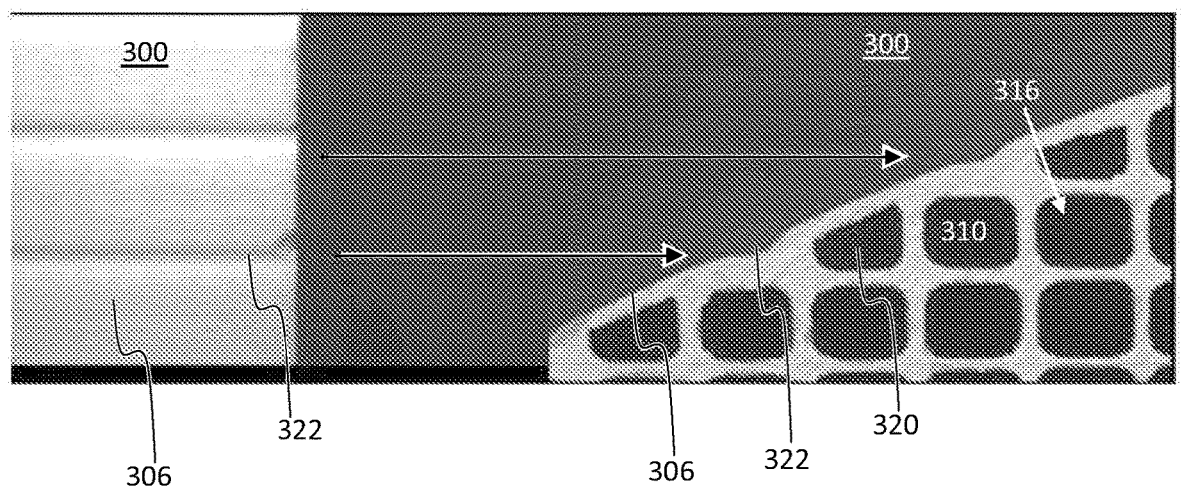
FIG. 3A is a photograph of a side view of a honeycomb body 300 and FIG. 3B is a photograph of an end view of the honeycomb body 300 of FIG. 3A showing grooves developed in skin due to mechanical cutting of wet extrudate.

FIG. 3A is a photograph of a side view of a honeycomb body 300 and FIG. 3B is a photograph of an end view of the honeycomb body 300 of FIG. 3A. The honeycomb body 300 includes a matrix 316 having a plurality of channel walls extending from an inlet face to an outlet face defining cell channels 310 therebetween, a skin 306 on the outer periphery of the matrix 316, and partial cell channels 320 adjoining the outer periphery of the matrix 316 adjacent the skin 306. Cutting of wet extrudate transverse to the extrusion direction during extrusion has been found to close partial cell channels 320 near the skin 306 and result in formation of grooves 322 on the outer surface 306 of the honeycomb body 300. As the closed partial cell is extruded a partial vacuum forms behind the closure to the extrusion die. After a length of extrudate has been extruded, the wet extrudate skin cannot withstand the partial vacuum and the partial cell channel collapses creating the skin groove 322.

The grooves 322 can cause distortion of the wet shape of the part and thus lower the isostatic (ISO) strength of the fired part. The grooves 322 can also cause skin fissures during drying and/or during firing. According to exemplary embodiments of the disclosure, grooves 322 can be reduced and eliminated to increase production efficiency by avoiding repairs or lost ware from such grooves 322.

Attempts to mitigate adverse effects of grooves 322 from cutting of wet extrudate have included in situ microwave heating, ring of hot air heating, manual cutting, mechanical scoring, etc. In situ refers to during extrusion. Thus, for example, the microwave heating, ring of hot air, manual cutting, and mechanical scoring are performed on the extrudate while it is still connected to the extrudate passing through the extrusion die, that is, during extrusion. Some of these solutions require manual labor, which can be costly and less efficient than machining, and other solutions work to some extent, but cause collateral adverse effects such as differential drying shrinkage and cell distortion leading to ISO strength reduction. Extruded pieces of wet greenware contain water (for example, 10%-25% by weight), and the wet greenware needs to be dried prior to the formation of the final product (article). In some cases, the ceramic greenware needs to be dried to greater than 98% (i.e., to having less than 2% moisture content by weight).

According to exemplary embodiments disclosed herein a non-contact method was surprisingly developed to automatically and precisely slit wet greenware skin, for example, wet channel body and honeycomb body extrudate skin, without contact that avoids groove formation without causing differential shrinkage and cell distortion. Laser machining of a wet green ceramic channel extrudate is disclosed where the extrudate can be laser machined in situ to form a cut in the channel extrudate. In these embodiments the channel extrudate is exposed to laser energy to ablate at least a portion of an outer periphery of the channel extrudate.

Figure 4:
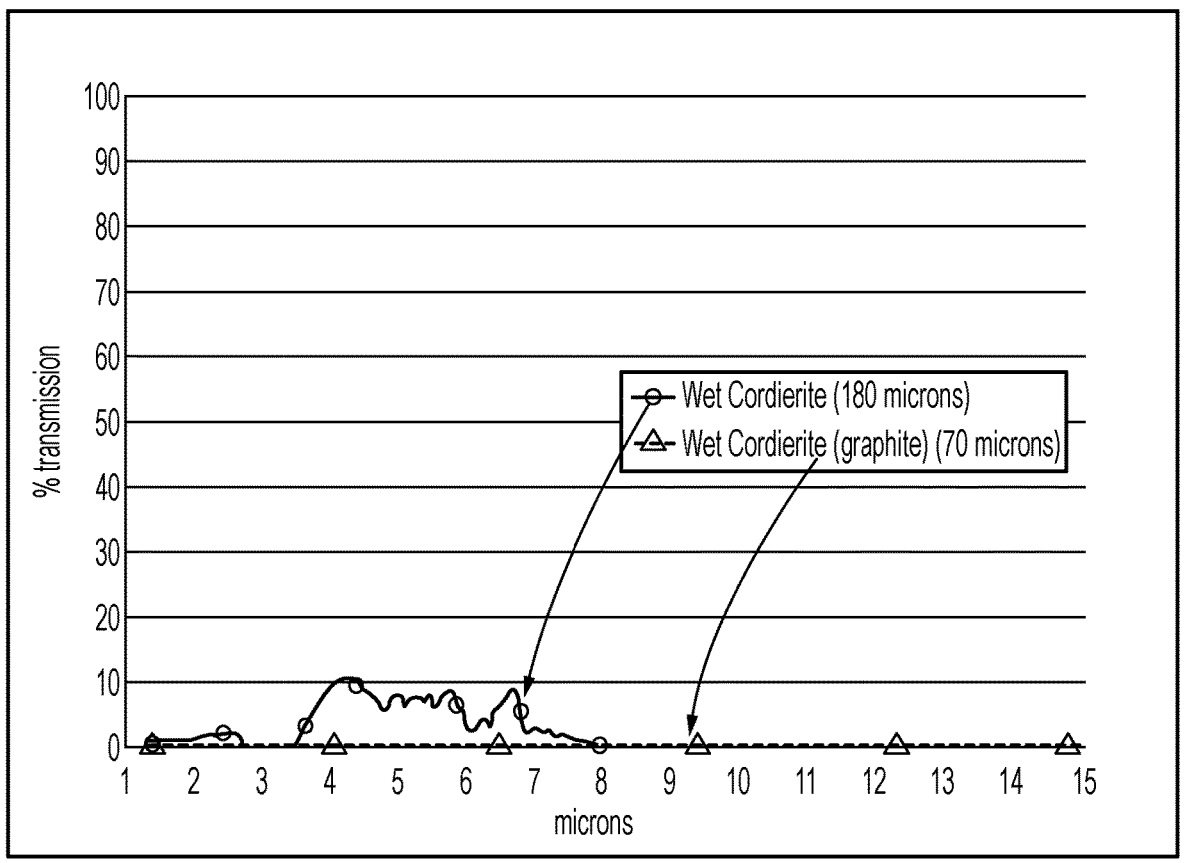
FIG. 4 is a graphical plot of data showing transmission measurements in infrared regime demonstrating very strong absorption by wet ceramic material.

Optical transmission measurements of wet cordierite batch are presented in FIG. 4. These measurements indicate wet cordierite has a strong absorption in the infrared wavelength range. According to exemplary embodiments of the disclosure, a focused laser beam is used to machine the wet green honeycomb body. For example, a laser source, such as a fiber laser, $CO_2$ laser, line laser, semiconductor diode laser, bezel beam laser, and the like, or a combination thereof, is used to machine an outer periphery of a wet greenware. For example, a laser can be used to cut a skin of a wet honeycomb body extrudate.

According to these exemplary embodiments, the technique can precisely cut the wet honeycomb body extrudate skin without deforming the skin because laser has no contact force. Instead, laser energy focuses on a very small portion of the wet green ceramic material. For example, the laser energy can be a 100 µm spot on the wet green ceramic material. As used herein laser machining includes laser cutting, slitting, slotting, scoring, drilling, etc. to form a laser cut, slit, slot, score, opening, hole, etc.

These methods of laser machining also do not deposit energy in the bulk of the wet honeycomb body extrudate leading to cell distortion. These methods of slitting the wet skin avoid groove formation by partial cell collapse. The partial cells are not collapsed and the laser cut pierces the outer periphery to form an opening through the outer periphery that allows air to flow through the opening into partial cell channels avoiding the vacuum leading to partial cell channel collapse and groove formation.

Figure 5:
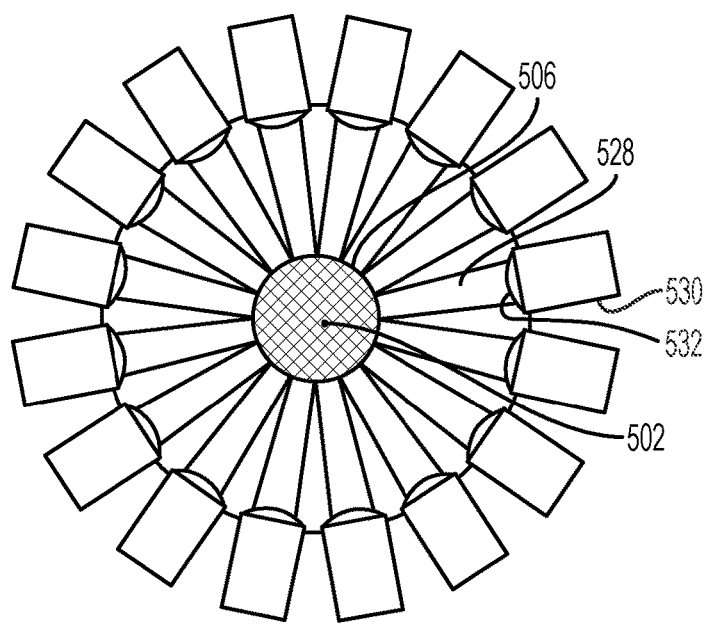
FIG. 5 is a schematic end view transverse to the axial orientation of a honeycomb body illustrating laser energy from fiber laser system split into multiple fiber-tip outlets coupled with focusing lenses to deliver energy symmetrically onto the wet ceramic batch skin according to exemplary embodiments of the disclosure.

According to exemplary embodiments of the disclosure, a laser machining system 500 for wet greenware cutting, e.g., slitting is shown in FIG. 5. FIG. 5 is a schematic end view transverse to the axial orientation of a wet green honeycomb extrudate 502 illustrating laser energy 528 from a fiber laser system 500 split into multiple fiber-tip outlets 530 coupled with focusing lenses 532 to deliver energy 528 symmetrically onto the wet ceramic batch skin 506. To efficiently implement laser skin slitting processes on an extrusion line, systems to deliver laser through fiber to many fiber outlets coupled with focusing lenses surrounding the part circumferentially can be utilized according to exemplary embodiments of the disclosure.

In some of these embodiments, the laser energy 528 can merely pierce the outer periphery at the partial cells to allow air to flow through the opening into partial cell channels avoiding the vacuum leading to partial cell channel collapse and groove formation. That is, the laser cut need not form a continuous cut circumscribing the extrudate 502, rather the laser cut can be a series of air holes or scores that pierce the outer periphery and circumscribe the extrudate 502 to allow air to flow through the opening into partial cell channels.

Figure 6A:
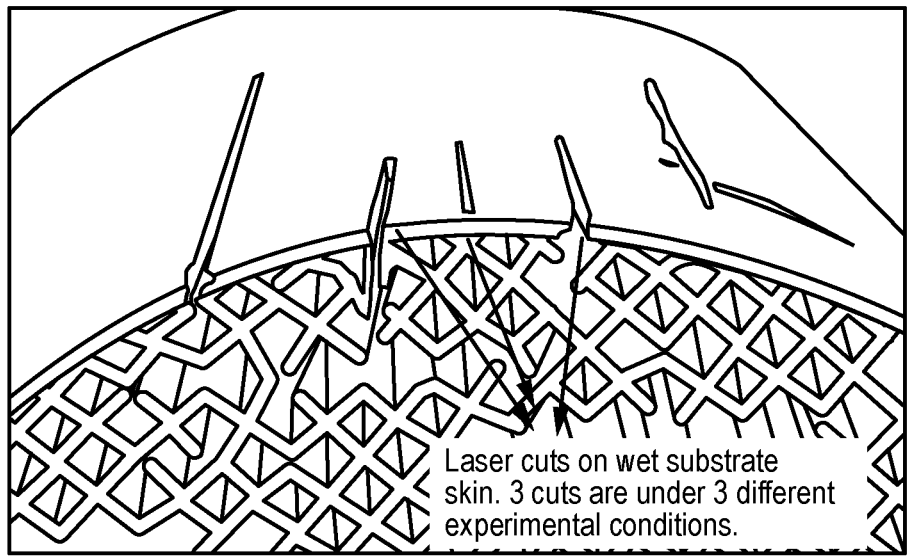
FIG. 6A is a photograph of laser machining of wet ceramic batch honeycomb body under three different experimental conditions according to exemplary embodiments of the disclosure.
Figure 6B:
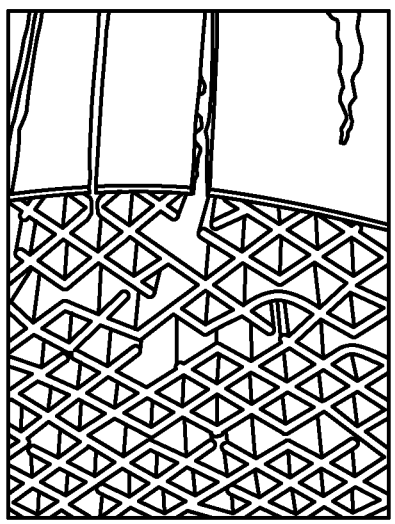
FIG. 6B is a detailed view of laser cuts shown in FIG. 6A.
Figure 6C:
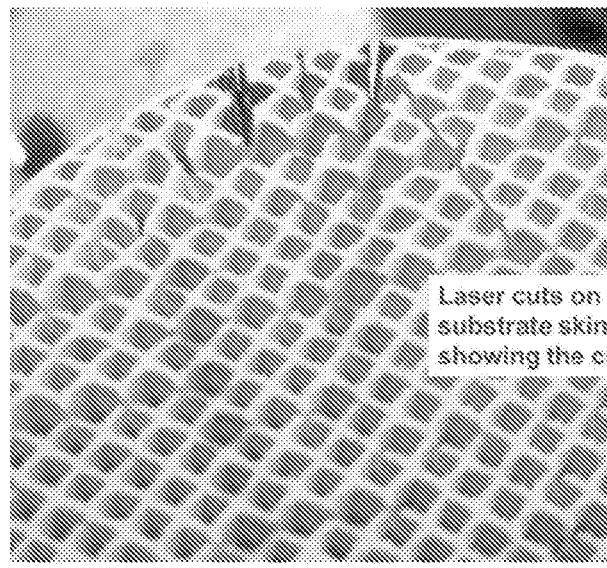
FIG. 6C is another detailed view of laser cuts shown in FIG. 6A.
Figure 6D:
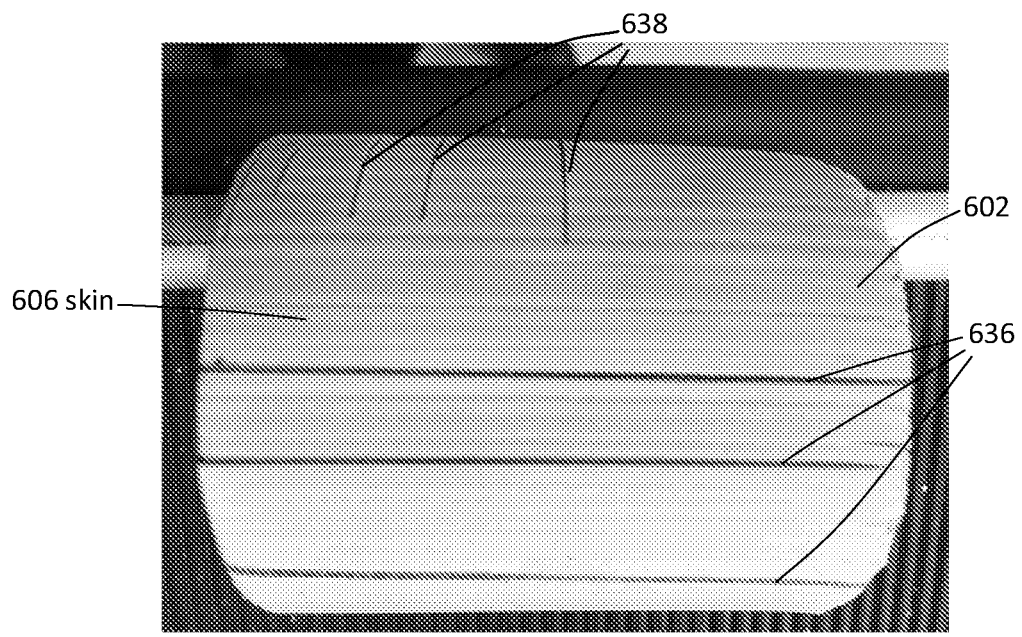
FIG. 6D is a photograph of experimental laser machined cut slits of wet ceramic batch honeycomb body in longitudinal and transverse directions according to exemplary embodiments of the disclosure.

FIG. 6A is a photograph of laser machining of wet honeycomb body extrudate under three different experimental conditions according to exemplary embodiments of the disclosure. FIG. 6B is a detailed view of laser cuts shown in FIG. 6A. FIG. 6C is another detailed view of laser cuts shown in FIG. 6A. FIG. 6D is a photograph of experimental laser machined cut slits of wet greenware honeycomb body extrudate in longitudinal and transverse directions according to exemplary embodiments of the disclosure. The honeycomb body 602 comprising a skin 606 has longitudinal laser cuts 636 and transverse laser cuts 638.

Based on the transmission measurements performed on wet cordierite material, it was determined that an infrared laser source might be adaptable for machining wet extrudate, for example wet skin. To demonstrate the feasibility of laser machining wet extrudate, a $CO_2$ laser source was focused (spot size of ~100 µm) on to the surface of a 2" wet cordierite extrudate of 200 cpsi with a 12 mil web thickness (31 cells per square cm with 30.5 µm web thickness). The wet cordierite extrudate substrate was moved relative to the laser beam. The power conditions were varied to show the control of depth of cut. The cut could be controlled; restricted to only skin or skin plus a few cells depth. The experiments clearly demonstrated using focused laser beam to machine wet greenware, for example, wet extrudate skin, with no closure of partial cell or cell distortion.

Figure 7:
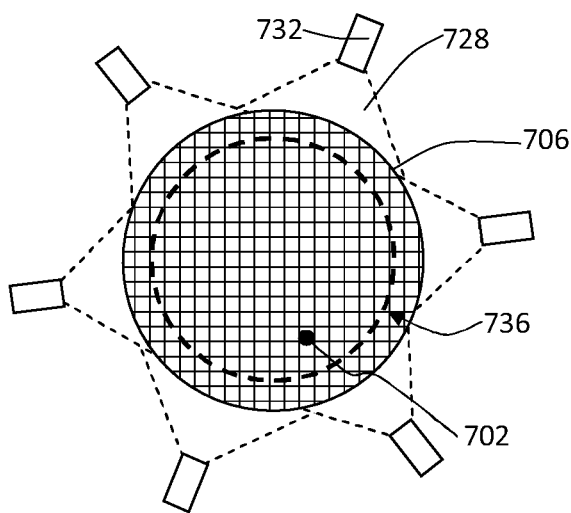
FIG. 7 is a schematic end view transverse to a wet ceramic batch honeycomb body illustrating a circumferential array of line lasers that surround an extrudate to laser machine through wet skin in situ on an extrusion line according to exemplary embodiments of the disclosure.

FIG. 7 is a schematic end view transverse to a wet ceramic batch honeycomb body illustrating a circumferential array of line laser sources that surround the extrudate to laser machine through wet skin in situ on an extrusion line according to exemplary embodiments of the disclosure. In situ refers to during extrusion. Thus, for example, the circumferential array of line laser sources laser machine the extrudate while it is still connected to the extrudate passing through the extrusion die, that is, during extrusion. The wet greenware extrudate 702 has peripheral skin 706 extending in the axial direction. Line laser sources 732 irradiate line laser energy to the skin 706 located to cover an outer surface cross section perpendicular to the longitudinal axis of the honeycomb extrudate 702 according to exemplary embodiments of the disclosure. The longitudinal axis of the extrudate is also referred to herein as the extrudate travel direction and the extrusion direction. It will be understood that the extrudate can comprise bow, in which case the axial direction of the channels may deviate from the extrusion direction and/or the extrudate travel direction. The extrusion process referred to herein as an extrusion line can be a horizontal extrusion line or a vertical extrusion line.

According to exemplary embodiments, the laser source can emit laser energy that can have a wavelength ($\lambda$) in a certain range, for example, from 800 nm to 1 µm, in another example, from 1 µm to 15 µm, in another example, from 300 nm to 500 nm, or even, in another example, from 200 nm to 400 nm. In addition to the laser sources (lasers) described herein, the lasers can include semiconductor diode array lasers, quantum cascade (QCL) lasers, and the like.

Figure 8:
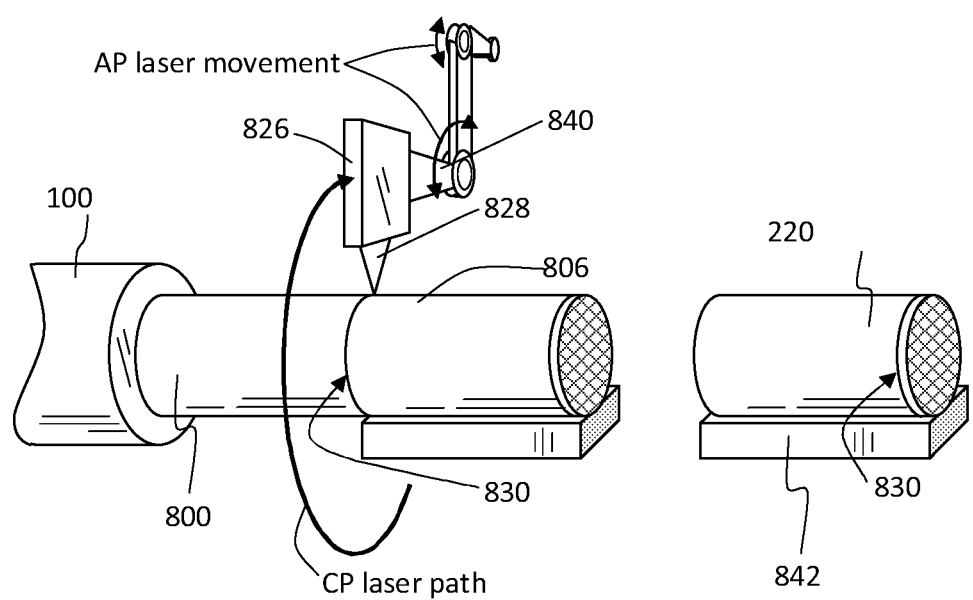
FIG. 8 is a perspective schematic view illustrating a laser and/or optics that can move circumferentially along with azimuthal rotation around the wet ceramic batch honeycomb body to laser machine through wet skin in situ on an extrusion line according to exemplary embodiments of the disclosure.

FIG. 8 is a perspective schematic view illustrating a laser and/or optics (laser source) that can move circumferentially about the extrudate as well as azimuthally rotate the laser energy around the wet greenware honeycomb body extrudate to laser machine through wet skin in situ on an extrusion line according to exemplary embodiments of the disclosure. The extrudate 800 is extruded from the extruder 100 in an axial direction as shown, for example in FIG. 1. The extrudate 800 has a skin 806 around the periphery of the extrudate and extending in the axial direction. The laser 826, such as a line laser, irradiates laser energy 828 onto the extrudate skin 806 around the circumference of the extrudate 800 along a laser cut 830 transverse to the axial direction. For example, the laser 826 moves along circumferential path CP while rotating azimuthally to precisely and uniformly machine the extrudate 800 along the laser cut 830. The azimuthal rotation provides the laser 826 at a constant distance and direction to the extrudate skin 806 as the laser rotates around the extrudate 800 on laser path CP. For example, the laser can be perpendicular to a tangent of the extrudate surface and a determined distance from the extrudate surface 806 around laser cut 830. The determined distance can be constant. For example, the azimuthal and circumferential movement can be accomplished with a robotic gantry comprising arms and pivots to circumscribe the extrudate and articulate the laser azimuthally about paths AP.

In some of these embodiments the extrudate 800 moves axially away from the extruder 100 as the laser 826 machines laser cut 830 transverse to the axial direction. Accordingly, the laser 826 can also move axially at a corresponding rate to make a transverse laser cut 830. That is, for example, the laser 826 begins cutting the extrudate 800 at one location on the extrudate skin 806, machines a laser cut 830 by circumscribing the extrudate 800 to meet the beginning location such that a plane through the circumscribed laser cut is transverse to the axial direction.

In some of these embodiments the laser 826 can circumscribe the extrudate 800 as described herein to cut through extrudate skin 806 along laser cut 830 to a first predetermined depth and circumscribe the extrudate 800 a second time to cut to a second predetermined depth. Such multiple cutting circumscriptions can cut through the entire extrudate 800, a single circumscription can cut through the entire extrudate, or a second cutting method may be used after the laser 826 has cut to the first or second predetermined depths. For example, a band saw may sever the wet green honeycomb body 220 from the extrudate 800 adjacent or along the laser cut 830 after one or more laser 826 circumferential passes.

In an exemplary embodiment, the laser 826 circumscribes the extrudate 800 as described herein to cut through extrudate skin 806 along laser cut 830 to a first predetermined depth, then a mechanical cutter such as a band saw or wire cutter cuts through the extrudate 800 adjacent to but spaced further from extruder 100 so that air can enter channels of collapsed partial cells through the laser cut 830 during mechanical cutting to avoid skin grooving. The process can be repeated at a second position on the extrudate resulting in honeycomb body 220 on tray 842. In exemplary embodiments where the laser cut 830 is wider than a mechanical cutter kerf, the mechanical cutter can cut at the laser cut 830 and air can still enter channels of collapsed partial cells through the laser cut 830 during mechanical cutting to avoid skin grooving.

In another exemplary embodiment, the laser 826 can cut the extrudate 800 as described herein after or simultaneously as the mechanical cutter such as a band saw or wire cutter cuts through the extrudate 800. The laser 826 then cuts adjacent to but spaced closer to the extruder 100 than the mechanical cut so that air can enter channels of collapsed partial cells through the laser cut 830 during subsequent extrusion to break the vacuum before it collapses the partial cell channels to avoid skin grooving.

According to an aspect of the disclosure a method is disclosed for manufacturing a channel body. In exemplary embodiments, the method comprises extruding a channel extrudate, the channel extrudate comprising an outer periphery and at least one channel, wherein the channel extrudate comprises at least one of a ceramic powder, ceramic precursor, and ceramic composition; and laser machining in situ the channel extrudate as it is extruded to form a laser cut in the channel extrudate. The laser machining comprises exposing the channel extrudate to laser energy on at least a portion of the outer periphery.

In some of these exemplary embodiments, the laser cut pierces the outer periphery to form an opening through the outer periphery exposing the at least one channel to ambient atmosphere through the opening to prevent the outer periphery from collapsing on the at least one channel. In some of these embodiments, the method further comprises severing a channel body from the channel extrudate to form the channel body. In some of these embodiments, the method further comprises drying the channel body to form a dry green ceramic body; and firing the dry green ceramic body to form a porous ceramic body.

The method according to these exemplary embodiments can further comprise mechanically cutting the channel extrudate adjacent the laser cut, wherein the mechanical cutting severs a channel body from the channel extrudate to form the channel body. In these exemplary embodiments the exposing comprises moving a laser source in an extrusion direction of the channel extrudate to expose the channel extrudate to laser energy. In these exemplary embodiments the portion comprises a portion of a skin of the channel extrudate. For example, the channel extrudate comprises a honeycomb extrudate comprising a plurality of channels, and the portion further comprises at least one cell channel depth within the channel extrudate.

In the method according to some of these exemplary embodiments the laser machining comprises cutting the channel extrudate perpendicular to a direction the extrudate moves as it is extruded. For example, the laser cut circumscribes the channel extrudate. For example, the exposing comprises circumscribing the channel extrudate with a laser source to expose the channel extrudate to laser energy. For example, the exposing comprises a laser source at least partially revolves about the channel extrudate during the laser machining to expose the channel extrudate to laser energy. At least partially circumscribing the honeycomb extrudate can include completely circumscribing the extrudate.

In some of these embodiments, the exposing comprises circumscribing the channel extrudate with a plurality of laser sources to expose the channel extrudate to laser energy. In some of these embodiments, at least two of the plurality of laser sources are co-planar in a plane perpendicular to the channel extrudate travel direction. In some of these embodiments, the exposing comprises a plurality of laser sources circumscribe the channel extrudate to expose the channel extrudate to laser energy to laser cut adjacent segments of the portion of the outer periphery.

In the method according to some of these exemplary embodiments exposing the channel extrudate comprises irradiating at least one of point laser energy and line laser energy. In some of these embodiments, the channel extrudate comprises greater than 10% water by weight. In some of these embodiments the channel extrudate comprises a honeycomb structure.

According to another aspect of the disclosure a method is disclosed for manufacturing a honeycomb body. In exemplary embodiments, the method comprises laser cutting at least a portion of a green extrudate as the extrudate moves in an extrudate travel direction. In this method, the green extrudate is comprised of at least one of a ceramic powder, ceramic precursor, and ceramic composition.

In some of these exemplary embodiments, the laser cutting comprises applying laser irradiation in a direction perpendicular to the extrudate travel direction. In some of these exemplary embodiments, the laser irradiation is applied in the form of at least one of a point beam and a line beam. In some of these exemplary embodiments, the laser cutting comprises applying laser irradiation to the green extrudate by at least one laser source. In some of these exemplary embodiments, the at least one laser source at least partially revolves around the green extrudate during the laser cutting.

In the method according to some of these exemplary embodiments, laser irradiation is applied to the green extrudate by a plurality of lasers. In some of these exemplary embodiments, at least two of the plurality of lasers are coplanar. In some of these exemplary embodiments, laser irradiation is applied to the green extrudate by at least one laser source which moves in the extrudate travel direction at the same travel rate as the extrudate. In some of these exemplary embodiments, the green extrudate comprises an outer periphery, and the laser cutting forms a laser cut in at least the outer periphery.

In the method according to some of these exemplary embodiments, the laser cut is a completely circumscribing laser cut. In some of these exemplary embodiments, the green extrudate comprises greater than 10% water by weight. In some of these exemplary embodiments, the green extrudate comprises a honeycomb structure. In some of these exemplary embodiments, a laser cut is formed in the honeycomb structure which extends through the outer periphery. In some of these exemplary embodiments, a laser cut is formed in the honeycomb structure which extends through the outer periphery and into the walls of at least one cell of the honeycomb structure.

In the method according to some of these exemplary embodiments, the laser cutting comprises severing a green body from the extrudate. In some of these exemplary embodiments, a green body is severed from the extrudate. In some of these exemplary embodiments, the severing comprises laser cutting and mechanical cutting. The method according to these exemplary embodiments can further comprise heating the green body. In some of these exemplary embodiments, the heating comprises drying the green body. In some of these exemplary embodiments, the heating comprises firing the green body to form a porous ceramic body.

According to another aspect of the disclosure a system for in situ cutting a wet green ceramic extrudate is disclosed. According to exemplary embodiments, the system comprises a laser source configured to irradiate laser energy to an outer periphery of a wet green ceramic extrudate, wherein the laser energy is adapted to laser cut at least a portion of an outer periphery of the wet green ceramic extrudate, wherein the wet green ceramic extrudate comprises at least one channel and the outer periphery, and wherein the laser cut pierces the outer periphery to form an opening through the outer periphery exposing the at least one channel to ambient atmosphere through the opening.

The system according to some of these exemplary embodiments further comprises a support member configured to transport the wet green ceramic extrudate, wherein the support member is configured to transport in a first direction and the laser source is configured to irradiate the laser energy to the outer periphery in a second direction perpendicular to the first direction. In some of these embodiments, the laser source is configured to at least partially circumscribe and revolve around the wet green ceramic extrudate to provide laser energy perpendicular to a tangent of the extrudate surface and at a determined distance from the extrudate surface. In some of these embodiments, the laser source comprises a plurality of laser sources configured to be disposed at least partially circumferentially about the wet green ceramic extrudate to cut adjacent segments of the portion of the outer periphery. In the system according to some of these exemplary embodiments, at least two of the plurality of the laser sources are co-planar in a plane perpendicular to the wet green ceramic extrudate travel direction. Disposed at least partially circumferentially about the wet green ceramic extrudate can include completely circumscribing the wet green ceramic extrudate.

Reference throughout this specification to exemplary embodiments and similar language throughout this specification may, but do not necessarily, refer to the same embodiment. Furthermore, the described features, structures, or characteristics of the subject matter described herein with reference to an exemplary embodiment may be combined in any suitable manner in one or more exemplary embodiments.

It will be apparent to those skilled in the art that various modifications and variations can be made in the present disclosure without departing from the spirit or scope of the disclosure. Thus, it is intended that the appended claims cover the modifications and variations of this disclosure provided they come within the scope of the appended claims and their equivalents.

The invention claimed is:

1. A method of manufacturing a cellular ceramic structure, the method comprising:
    extruding a mixture to form a wet honeycomb extrudate comprising partial cell channels adjoining an outer periphery thereof, the mixture comprising at least one of a ceramic or ceramic precursor material; and
    laser machining the wet extrudate using a laser source to form a laser cut completely circumscribing the outer periphery of the wet extrudate, wherein the laser cut breaks a partial vacuum forming within the wet extrudate during said extruding by piercing the outer periphery to form an opening therethrough exposing the partial cell channels to ambient atmosphere.

2. The method of claim 1, wherein the opening exposes the partial cell channels to ambient atmosphere therethrough so as to prevent the outer periphery from collapsing on the partial cell channels.

3. The method of claim 1, further comprising severing a body from the wet extrudate.

4. The method of claim 3, further comprising: drying the body to form a dry green ceramic body; and firing the dry green ceramic body to form a porous ceramic body.

5. The method of claim 1, further comprising mechanically cutting the wet extrudate adjacent to the laser cut to sever a body from the wet extrudate.

6. The method of claim 1, wherein the laser cut is formed while moving the laser source in a travel direction of the extrudate.

7. The method of claim 1, wherein the outer periphery comprises a skin of the extrudate.

8. The method of claim 1, wherein the wet extrudate comprises intersecting walls forming mutually adjoining cell channels extending in a travel direction of the extrudate, the partial cell channels comprising a portion of the mutually adjoining cell channels.

9. The method of claim 1, wherein the laser machining comprises laser cutting the wet extrudate perpendicular to a travel direction of the extrudate as the extrudate moves.

10. The method of claim 1, wherein the laser source at least partially revolves about the wet extrudate during the laser machining.

11. The method of claim 1, wherein the laser source is one of a plurality of laser sources circumscribing the wet extrudate.

12. The method of claim 11, wherein at least two of the plurality of laser sources are co-planar in a plane perpendicular to a travel direction of the extrudate.

13. The method of claim 11, wherein laser machining the wet extrudate comprises exposing the outer periphery of the wet extrudate to laser energy from the plurality of laser sources so as to form the laser cut from a plurality of cuts corresponding to the plurality of laser sources in adjacent segments of the outer periphery.

14. The method of claim 1,
wherein the wet extrudate is a green ceramic extrudate.

15. The method of claim 1, wherein the wet extrudate comprises greater than 10% water by weight.

\* \* \* \* \*

UNITED STATES PATENT AND TRADEMARK OFFICE
CERTIFICATE OF CORRECTION

PATENT NO. : 11,345,059 B2
APPLICATION NO. : 16/308222
DATED : May 31, 2022
INVENTOR(S) : Ravindra Kumar Akarapu et al.

It is certified that error appears in the above-identified patent and that said Letters Patent is hereby corrected as shown below:

On the Title Page

On the page 2, in Column 2, under "Other Publications", Line 1, delete "Interational" and insert -- International --.

On the page 2, in Column 2, under "Other Publications", Line 4, delete "2019)" and insert -- (2019) --.

Signed and Sealed this
First Day of August, 2023

Katherine Kelly Vidal
*Director of the United States Patent and Trademark Office*